Patented Aug. 30, 1927.

1,640,737

UNITED STATES PATENT OFFICE.

GUY B. TAYLOR, OF WILMINGTON, DELAWARE, AND ALBERT S. RICHARDSON, OF CINCINNATI, OHIO, ASSIGNORS TO E. I. DU PONT DE NEMOURS & COMPANY, OF WILMINGTON, DELAWARE, A CORPORATION OF DELAWARE.

NITRATION PROCESS AND NITRATING MIXTURE THEREFOR.

No Drawing.   Application filed July 15, 1922.   Serial No. 575,328.

This invention relates to the nitration of organic compounds, and comprises subjecting such compound to the action of a mixed acid consisting essentially of nitric acid, sulphuric acid, and nitroso-sulphuric acid.

We have discovered that the acid mixture obtainable by inducing a reaction between nitrogen peroxide ($NO_2$) and sulphuric acid, and containing a relatively large percentage of nitroso-sulphuric acid in addition to nitric and sulphuric acids, constitutes an excellent nitrating agent. The reaction between nitrogen peroxide and sulphuric acid yields equal molecular proportions of nitric acid and nitroso-sulphuric acid, the resulting percentage by weight of the latter being almost twice that of the former. We have found, contrary to what might have been expected, that the nitroso-sulphuric acid present in the aforesaid mixture does not interfere with the nitrating action of the nitric acid, but is a completely inert substance behaving as a diluent.

Our discovery of the effective nitrating action of the above-described mixed acid, despite the presence therein of nitroso-sulphuric acid, makes practicable the utilization, in an economical and advantageous way, of the products of ammonia oxidation. The several steps of the process may be explained as follows:—

The oxidation of ammonia for purposes of the present invention may be said to take place in accordance with the following equations:

$$4NH_3 + 5O_2 = 4NO + 6H_2O \quad (1)$$
$$4NO + 2O_2 = 4NO_2 \quad (2)$$

When the $NO_2$ is passed into sulphuric acid, the reaction involved is $$2NO_2 + H_2SO_4 = HNOSO_4 + HNO_3 \quad (3)$$

the amount of $NO_2$ used being such as to leave unchanged a substantial part of the sulphuric acid initially present. The nitration of benzene, for instance, with the resulting mixed acid proceeds in the usual way according to the equation:

$$C_6H_6 + HNO_3 = C_6H_5NO_2 + H_2O \quad (4)$$

By treating the resulting waste acid with steam or sulphur dioxide the $HNOSO_4$ present is decomposed as follows:

$$HNOSO_4 \rightarrow NO + H_2SO_4 \quad (5)$$

the NO being then oxidized to $NO_2$ according to equation (2).

As will be apparent from the above outline, the new process is a cyclic one. One half of the nitrogen which is originally introduced as $NO_2$ into the sulphuric acid goes into the nitro compound formed in the course of a cycle, while the other half is regenerated in the form of $NO_2$ and again absorbed in sulphuric acid to form more mixed acid.

If the substance to be nitrated is easily vaporized—for example benzene or toluene—its vapor may be mixed with nitrogen peroxide, and reactions 3 and 4 carried out simultaneously.

An important condition for the economic success of the operation is the completeness of reaction (2). In other words the nitrogen oxides used for reaction (3) must contain as little NO as possible to avoid excessive production of $HNOSO_4$ with resulting increase in the expense of the denitration step.

The new process may be illustrated by the following example:

201 parts by weight of a spent acid from a previous similar nitration and 152 parts of benzene are placed in a reaction vessel and 800 parts of mixed acid of composition 15.6% $HNO_3$, 29.5% $HNOSO_4$, and 44.3% $H_2SO_4$ are added in the course of an hour, maintaining the temperature at 35° C. and stirring vigorously. After adding the acid the temperature is raised to 48° for about 15 minutes. A yield of 232.5 parts of crude nitrobenzene may be obtained, which after correcting for impurities is shown by calculation to be 96% of theory. After washing, the nitrobenzene is more than 99% pure.

It is essential, to attain the most successful working out of this process, that the denitration of the waste acid be accomplished economically. One suitable method for effecting this denitration comprises treating the waste acid with $SO_2$ to cause the following reaction:—

$$2HNOSO_4 + SO_2 + 2H_2O = 3H_2SO_4 + 2NO \quad (6)$$

This reaction may be carried out by passing the spent acid downwardly through a tower counter-current to a stream of sulphur dioxide. The nitric oxide (NO) liberated in the course of the reaction is withdrawn and oxidized with air to nitrogen peroxide ($NO_2$). An advantage in the use of $SO_2$, instead of steam, to effect denitration of the spent acid containing nitroso-sulphuric acid is that concentration of the sulphuric acid which is formed is rendered unnecessary. Not only does the use of $SO_2$ avoid diluting the sulphuric acid with steam, but the reaction with $SO_2$ to form $H_2SO_4$ actually consumes water; consequently, the sulphuric acid from the spent acid is delivered at a higher concentration than it possessed in the spent acid.

The composition of the nitrating mixture is not, of course, limited to the specific composition mentioned in the above example, but may vary considerably, the best composition depending to some extent upon the organic compound to be nitrated. In determining the composition of the nitrating acid, the composition of the spent acid resulting from the nitration should be taken into consideration. Experiments have shown that slightly better yields are obtained in those cases where the water content of the spent acid is lowest. When this water content approached 20%, there was a tendency toward evolution of nitrogen oxides. If less than 17%, no such fuming was observed. In choosing an optimum composition of nitrating acid for the nitration of benzene, the factors to be considered are—

1. Stability of nitroso-sulphuric acid in the spent acid.
2. Solubility of nitroso-sulphuric acid in the spent acid.
3. Denitration of the spent acid.
4. Solubility of nitrobenzene in the spent acid.
5. Yield and purity of nitrobenzene.

A low water content of the spent acid is favorable toward factors 1 and 2 and, within the range of our experiments, toward factor 5. A higher water content is desirable for factors 3 and 4. Taking all these factors into consideration leads to the conclusion that the following ought to be a good acid recipe for nitrobenzene manufacture.

*Acid compositions.*

|  | Nitrating acid | Spent acid |
|---|---|---|
|  | Per cent | Per cent |
| $HNO_3$ | 15.0 | 0.0 |
| $HNOSO_4$ | 30.0 | 33.6 |
| $H_2SO_4$ | 47 to 45 | 52.5 to 50.2 |
| $H_2O$ | 8 to 10 | 13.9 to 16.2 |

As has been indicated above, our new process is not limited to the production of aromatic nitro compounds, but is applicable to the nitration of organic compounds in general to form both aromatic nitro compounds and nitrates. Thus, instead of treating an aromatic hydrocarbon, we may treat glycerine or glycols by this process to produce the corresponding nitrates. These polyhydric alcohol nitrates, containing $-NO_2$ radicals attached to oxygen, as well as the compounds in which the $-NO_2$ radical is attached directly to carbon, may be referred to generically as nitro compounds.

We claim:

1. The process of producing an organic nitro compound which comprises absorbing nitrogen peroxide in sulphuric acid to form a mixture containing substantial proportions of nitric acid, sulphuric acid, and nitroso-sulphuric acid, subjecting an organic compound to be nitrated to the action of said mixture until reaction with the nitric acid of the mixture is substantially complete, and then separating from the spent acid the nitro-compound formed.

2. The process of producing an organic nitro compound which comprises absorbing nitrogen peroxide in sulphuric acid to form a mixture containing substantial proportions of nitric acid, sulphuric acid, and nitroso-sulphuric acid, subjecting an organic compound to be nitrated to the action of said mixture until reaction with the nitric acid of the mixture is substantially complete, separating from the spent acid the nitro-compound formed, denitrating the spent acid to form free nitric oxide, oxidizing the nitric oxide to nitrogen peroxide, and absorbing the latter in sulphuric acid.

3. The cyclic process of producing an aromatic nitro-compound which comprises absorbing nitrogen peroxide in concentrated sulphuric acid to form a mixture containing substantial proportions of nitric, sulphuric, and nitroso-sulphuric acids, subjecting an aromatic compound to the action of said mixture until reaction with the nitric acid of the mixture is substantially complete, separating the resulting aromatic nitro-compound from the spent acid, denitrating the spent acid to form free nitric oxide, oxidizing the latter to nitrogen peroxide, and absorbing the nitrogen peroxide in concentrated sulphuric acid to form a fresh nitrating acid mixture.

4. The cyclic process of producing an aromatic nitro-compound which comprises absorbing nitrogen peroxide in concentrated sulphuric acid to form a mixture containing substantial proportions of nitric, sulphuric, and nitroso-sulphuric acids, subjecting an aromatic compound to the action of said mixture until reaction with the nitric acid of the mixture is substantially complete, separating the resulting aromatic nitro-compound from the spent acid, denitrating the spent acid with sulphur dioxide to convert the nitroso-sulphuric acid into sulphuric acid and free nitric oxide, oxidizing the latter to nitrogen peroxide, and absorbing the nitrogen peroxide in concentrated sulphuric acid to form a fresh nitrating acid mixture.

5. The process of producing organic nitro-compounds which comprises treating an organic compound with a nitrating acid mixture containing substantial proportions of nitric, sulphuric, and nitroso-sulphuric acids.

6. The process of producing organic nitro-compounds which comprises treating an organic compound with a nitrating acid mixture consisting essentially of sulphuric acid and approximately equal molecular proportions of nitric acid and nitroso-sulphuric acid.

7. The process of producing an aromatic nitro-hydrocarbon which comprises treating an aromatic hydrocarbon with a nitrating acid mixture containing substantial proportions of nitric, sulphuric, and nitroso-sulphuric acids.

8. The process of producing an aromatic nitro-hydrocarbon which comprises treating an aromatic hydrocarbon with a nitrating acid mixture consisting essentially of sulphuric acid and approximately equal molecular proportions of nitric acid and nitroso-sulphuric acid.

9. The process of producing organic nitro-compounds which comprises treating an organic compound with a nitrating acid mixture containing about 15% of nitric acid, about 30% of nitroso-sulphuric acid, from about 47 to 45% of sulphuric acid, and from about 8 to 10% of water.

10. The process of producing an aromatic nitro-hydrocarbon which comprises treating an aromatic hydrocarbon with a nitrating acid mixture containing about 15% of nitric acid, about 30% of nitroso-sulphuric acid, from about 47 to 45% of sulphuric acid, and from about 8 to 10% of water.

11. A nitrating acid mixture comprising sulphuric acid, and about equal molecular proportions of nitric acid and nitroso-sulphuric acid, said mixture being obtainable by absorbing nitrogen peroxide in sulphuric acid.

12. The process of nitrating a volatile organic compound which comprises bringing in contact with sulphuric acid a mixture of the vapor of said organic compound with nitrogen peroxide, and separating the resulting organic nitro-compound from the spent acid.

13. The process of nitrating a volatile organic compound which comprises bringing in contact with sulphuric acid a mixture of the vapor of said organic compound with nitrogen peroxide, separating the resulting organic nitro-compound from the spent acid, generating nitric oxide from the nitroso-sulphuric acid component of the spent acid, oxidizing the nitric oxide to nitrogen peroxide, mixing the latter with vapor of said organic compound, and bringing the resulting mixture in contact with sulphuric acid to form an additional quantity of organic nitro-compound.

In testimony whereof we affix our signatures.

GUY B. TAYLOR.
ALBERT S. RICHARDSON.